US010642309B2

(12) United States Patent
Cheng et al.

(10) Patent No.: US 10,642,309 B2
(45) Date of Patent: May 5, 2020

(54) LAPTOP COMPUTER

(71) Applicant: Acer Incorporated, New Taipei (TW)

(72) Inventors: Yan-Fong Cheng, New Taipei (TW);
Cheng-Nan Ling, New Taipei (TW);
Yi-Ta Huang, New Taipei (TW);
Pao-Min Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/385,326

(22) Filed: Apr. 16, 2019

(65) Prior Publication Data

US 2019/0317552 A1  Oct. 17, 2019

(30) Foreign Application Priority Data

Apr. 17, 2018 (TW) .............................. 107113030 A

(51) Int. Cl.
| | |
|---|---|
| *G06F 1/16* | (2006.01) |
| *G06F 1/20* | (2006.01) |
| *E05D 7/00* | (2006.01) |
| *E05D 11/00* | (2006.01) |

(52) U.S. Cl.
CPC ............. *G06F 1/1616* (2013.01); *E05D 7/00* (2013.01); *E05D 11/00* (2013.01); *G06F 1/166* (2013.01); *G06F 1/203* (2013.01); *E05Y 2900/606* (2013.01)

(58) Field of Classification Search
CPC .................................................... G06F 1/166
USPC ........................... 361/679.27, 679.45, 679.55
See application file for complete search history.

(56) References Cited

U.S. PATENT DOCUMENTS

| | | | | |
|---|---|---|---|---|
| 5,347,424 A | * | 9/1994 | Akahane | G06F 1/1616 108/117 |
| 5,469,327 A | * | 11/1995 | Cheng | G06F 1/1616 108/1 |
| 6,053,589 A | * | 4/2000 | Lin | G06F 1/1616 312/271 |
| 6,097,595 A | * | 8/2000 | Cipolla | G06F 1/1616 248/685 |
| 6,961,240 B2 | * | 11/2005 | Janicek | G06F 1/1616 220/241 |

(Continued)

FOREIGN PATENT DOCUMENTS

| | | |
|---|---|---|
| TW | I465884 A | 8/2013 |
| TW | M542167 U | 5/2017 |
| TW | 201813484 A | 4/2018 |

OTHER PUBLICATIONS

Chinese language office action dated Dec. 12, 2018, issued in application No. TW 107113030.

*Primary Examiner* — Adrian S Wilson
(74) *Attorney, Agent, or Firm* — McClure, Qualey & Rodack, LLP

(57) ABSTRACT

A laptop computer includes a host, a hinge mechanism, and a display. The host includes a housing having a bottom surface, a raising mechanism disposed in the housing, and a pad connected to the raising mechanism, and adjacent to the bottom surface. The hinge mechanism is connected to the host and includes a first shaft connected to the raising mechanism. The display is affixed to the rotation element. When the display is rotated about the host, the first shaft drives the raising mechanism to change the distance between the top of the pad and the bottom surface.

11 Claims, 12 Drawing Sheets

(56) References Cited

U.S. PATENT DOCUMENTS

| | | | | |
|---|---|---|---|---|
| 7,679,905 B2* | 3/2010 | Wu | ............... | G06F 1/1613 248/372.1 |
| 7,784,752 B2* | 8/2010 | Tang | ............... | G06F 1/1616 248/188.2 |
| 7,926,781 B2* | 4/2011 | Wang | ............... | G06F 1/1616 248/351 |
| 7,950,611 B2* | 5/2011 | Tracy | ............... | G06F 1/1616 248/125.8 |
| 7,990,692 B2* | 8/2011 | Wang | ............... | G06F 1/1616 16/326 |
| 8,014,147 B2* | 9/2011 | Chen | ............... | G06F 1/1616 200/61.62 |
| 8,050,032 B2* | 11/2011 | Trang | ............... | G06F 1/1613 361/679.59 |
| 8,213,177 B2* | 7/2012 | Uttermann | ............... | H05K 5/0234 248/188.8 |
| 8,879,251 B2* | 11/2014 | Hsiu | ............... | G06F 1/166 361/679.59 |
| 8,934,238 B2* | 1/2015 | Huang | ............... | G06F 1/1679 361/679.55 |
| 9,030,820 B2* | 5/2015 | Guo | ............... | G06F 1/1637 361/679.59 |
| 9,042,086 B2 | 5/2015 | Hu | | |
| 9,354,669 B2* | 5/2016 | Chen | ............... | G06F 1/1681 |
| 2013/0250495 A1* | 9/2013 | Yu | ............... | G06F 1/1681 361/679.01 |
| 2018/0073613 A1 | 3/2018 | Chen et al. | | |

\* cited by examiner

LAPTOP COMPUTER

CROSS-REFERENCE TO RELATED APPLICATIONS

This Application claims priority of Taiwan Patent Application No. 107113030 filed on Apr. 17, 2018, the entirety of which is incorporated by reference herein.

BACKGROUND OF THE INVENTION

Field of the Invention

The present disclosure relates to a laptop computer, and in particular to a laptop computer with a raising mechanism linked with a hinge mechanism.

Description of the Related Art

A conventional laptop computer includes a host, a display, and a hinge mechanism. The display can be rotated relative to the host via the hinge mechanism. Moreover, the display can maintain its tilt relative to the host because of the hinge mechanism, providing the user with easy viewing of the display.

As each new generation of laptop computer becomes thinner than the last, there is less space available for the often bulky heat dissipation structures and fans required in laptop computers. Therefore, when such a laptop computer operates at high speed, it is necessary to increase the fan speed to increase the airflow inside of the laptop computer.

However, when the cooling airflow is insufficient to dissipate heat from such heat sources inside the laptop computer as the processing chip, the temperature of the processing chip can get too high. Moreover, in order to prevent damage to the processing chip, the laptop computer may reduce the processing speed of the processing chip, which leads to a loss of effectiveness.

Although existing hinge mechanisms for laptop computers have been generally adequate for their intended purposes, they have not been entirely satisfactory in all respects. Consequently, it would be desirable to provide a solution for improving the hinge mechanisms of laptop computers.

BRIEF SUMMARY OF THE INVENTION

The present disclosure provides a laptop computer, which can increase the space between the laptop computer and a reference plane supporting the laptop computer in a use position so as to increase the heat-dissipation efficiency of the host.

The present disclosure provides a laptop computer that includes a host, a hinge mechanism, and a display. The host includes a housing having a bottom surface; a raising mechanism disposed in the housing; and a footpad connected to the raising mechanism, and adjacent to the bottom surface, wherein the footpad has a top end far from the bottom surface. The hinge mechanism is connected to the host, and includes a first shaft connected to the raising mechanism. The display is connected to the hinge mechanism and is rotatable relative to the host via the hinge mechanism. When the display is rotated relative to the host, the first shaft drives the raising mechanism to change the distance between the top end and the bottom surface of the footpad.

In some embodiments, while the display is moving from the cover position to the open position, the distance between the top end and the bottom surface increases gradually. While the display is moving from the open position to the cover position, the distance between the top end and the bottom surface decreases gradually.

In some embodiments, the raising mechanism is a mechanical raising mechanism. In some embodiments, raising mechanism includes a gear connected to the first shaft; and a rack engaged with the gear, and connected to the footpad.

In some embodiments, the raising mechanism includes a gear assembly connected to the first shaft; and a cam connected to the gear assembly, and in contact with the footpad. When the display is rotated relative to the host, the gear assembly drives the cam to rotate.

In some embodiments, when the display is in a cover position, there is a first distance between the top end and the bottom surface. When the display is in an open position, the cam abuts the footpad, and there is a second distance between the top end and the bottom surface. The second distance is greater than the first distance.

In some embodiments, the host further includes a base disposed in the housing, and having a curved groove. The hinge mechanism further includes a rotation element including a curved portion located in the curved groove. When the display is rotated relative to the host, the curved portion is rotated relative to the curved groove along a curved path.

In some embodiments, the curved path is a circular path, and the curved groove and the curved portion are C-shaped.

In some embodiments, the hinge mechanism further includes a torque assembly connected to the rotation element, and configured to apply a torque between the host and the display; and a fixed element connected to the torque assembly, and affixed to the housing.

In some embodiments, the torque assembly includes the first shaft pivoting on the fixed element. The torque assembly further includes a connection element connected to the first shaft; and a second shaft connected to the connection element and the rotation element, and extending parallel to the first shaft.

In some embodiments, the torque assembly further includes torque elements disposed on the first shaft, and the torque elements are configured to apply a torque between the first shaft and the fixed element.

In some embodiments, laptop computer further includes a first curved cover connected to the rotation element; and a transmission wire connected to the host and the display, and located in the gap.

In some embodiments, the laptop computer further includes a first curved cover connected to the rotation element; a second curved cover connected to the rotation element, wherein a gap is formed between the second curved cover and the first curved cover; and a transmission wire connected to the host and the display, and located in the gap.

In conclusion, the laptop computer of the present disclosure utilizes the raising mechanism linked with the display to raise the rear side of the host when the display of the laptop computer in an open position. Therefore, the heat-dissipation space under the bottom of the host is increased, and thus the heat-dissipation efficiency of the host is improved.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
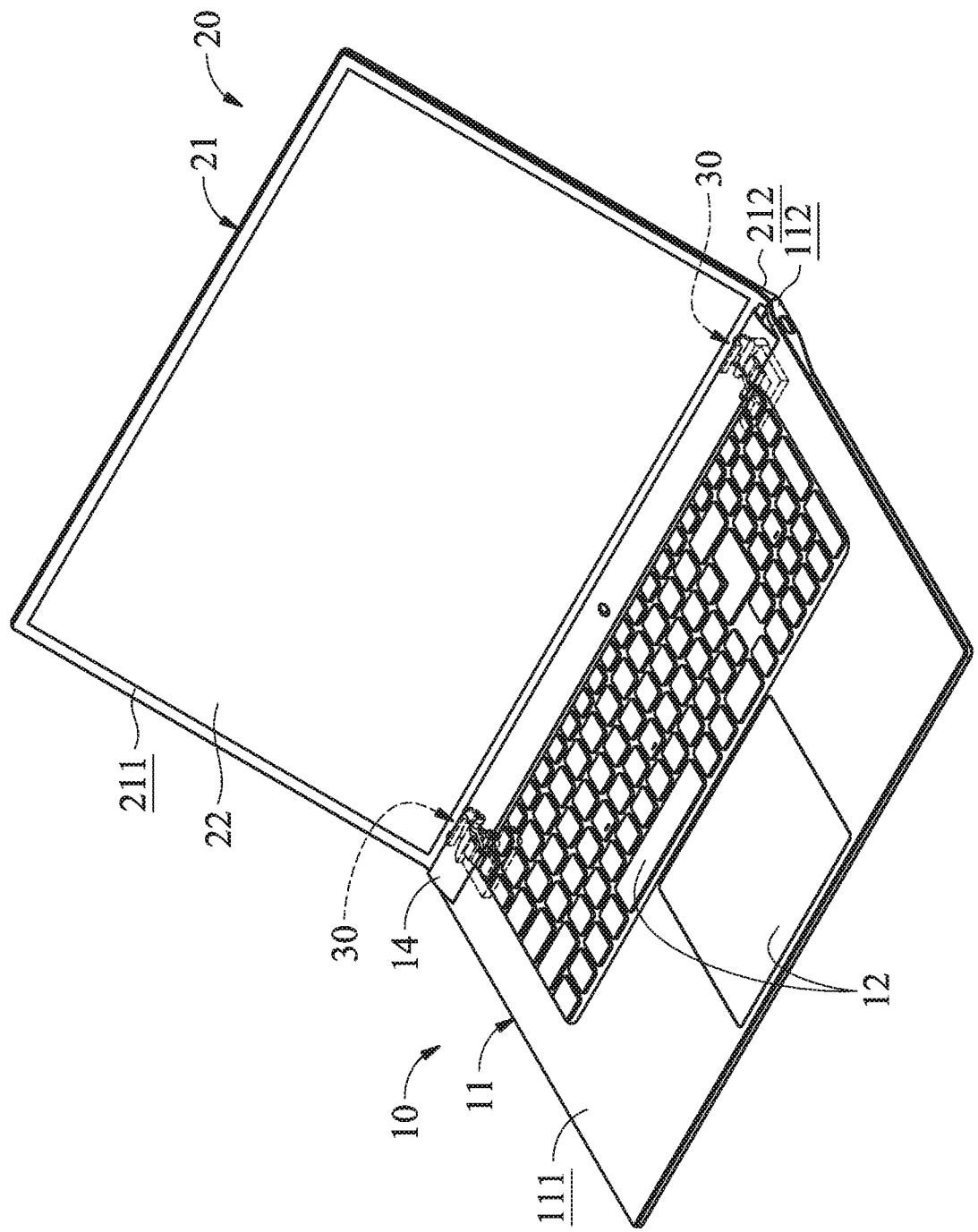
FIG. 1 is a perspective view of a laptop computer in accordance with some embodiments of the disclosure, wherein the laptop computer is in a use position.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

Spatially relative terms, such as upper and lower, may be used herein for ease of description to describe one element or feature's relationship to other elements or features as illustrated in the figures. The spatially relative terms are intended to encompass different orientations of the device in use or operation in addition to the orientation depicted in the figures. Moreover, the shape, size, and thickness depicted in the drawings may not be drawn to scale or may be simplified for clarity of discussion; these drawings are merely intended for illustration.

Figure 2:
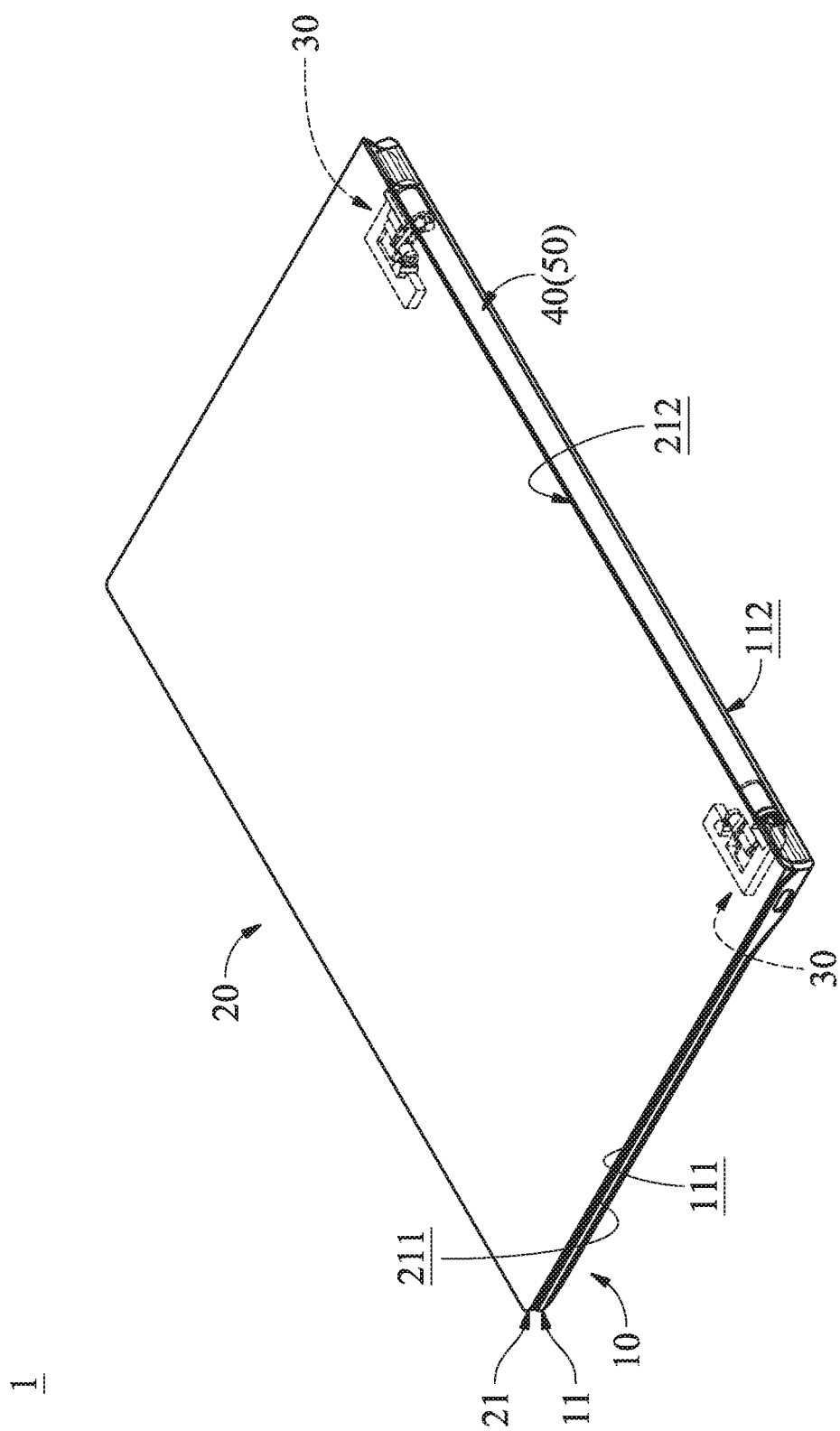
FIG. 2 is a perspective view of a laptop computer in accordance with some embodiments of the disclosure, wherein the laptop computer is in a closed position.

FIG. 1 is a perspective view of a laptop computer 1 in accordance with some embodiments of the disclosure, wherein the laptop computer 1 is in a use position. FIG. 2 is a perspective view of a laptop computer 1 in accordance with some embodiments of the disclosure, wherein the laptop computer 1 is in a closed position. The laptop computer 1 includes a host 10, a display 20, hinge mechanisms 30. The host 10 may be a plate structure.

The host 10 includes a housing 11 and operation devices 12. The housing 11 may be a plate structure. The operation device 12 is disposed on the operation surface 111 of the housing 11. The operation device 12 is configured to generate operation signals according to user's operation. The operation device 12 may a keyboard, a touchpad, and/or a touch panel. The host 10 may further include a processor, a motherboard, a memory, and/or a storage device (not shown in figures) disposed in the housing 11.

The display 20 pivots on the host 10 via the hinge mechanism 30. In other words, the display 20 rotates relative to the host 10 via the hinge mechanism 30. The display 20 may be a plate structure connected to the host 10. In some embodiments, the display 20 is a touch display.

The display 20 includes a display housing 21 and a display panel 22. The display panel 22 is disposed on the display surface 211 of the display housing 21. In some embodiments, the display panel 22 may be a touch display panel. The display panel 22 is configured to display an image. In some embodiments, the host 10 generates display signals according to the operation signals, and transmits the display signals to the display 20. The display 20 displays an image according to the display signals.

As shown in FIG. 1, when the display 20 is in an open position, the display 20 is inclined relative to the host 10. In some embodiments, the angle between the display 20 and the host 10 is greater than 90 degrees and less than 180 degrees. Moreover, the display surface 211 is inclined relative to the operation surface 111.

As shown in FIG. 2, when the display 20 is in a cover position, the display 20 covers the host 10, the display 20 may be contact with or substantially parallel to the host 10. In some embodiments, the angle between the display 20 and the host 10 is less than 10 degrees. Moreover, the display surface 211 covers the operation surface 111 of the housing 11, and the display surface 211 may be in contact with or substantially parallel to the operation surface 111.

As shown in FIGS. 1 and 2, the hinge mechanism 30 is connected to the host 10 and the display 20. The hinge mechanism 30 is located at the rear side 112 of the housing 11 and the rear side 212 of the display housing 21.

Figure 3:
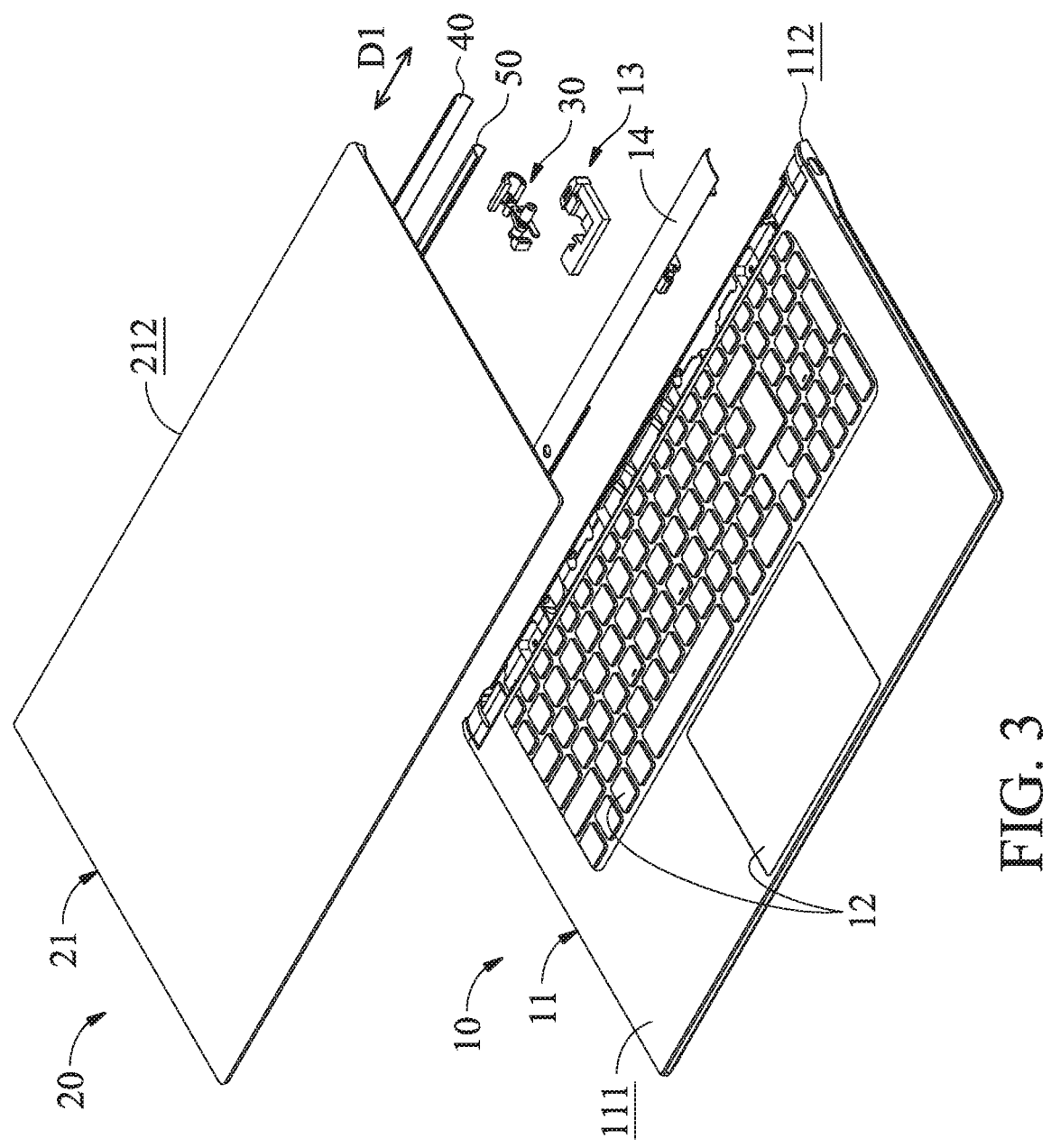
FIG. 3 is an exploded view of the laptop computer in accordance with some embodiments of the disclosure.
Figure 4:
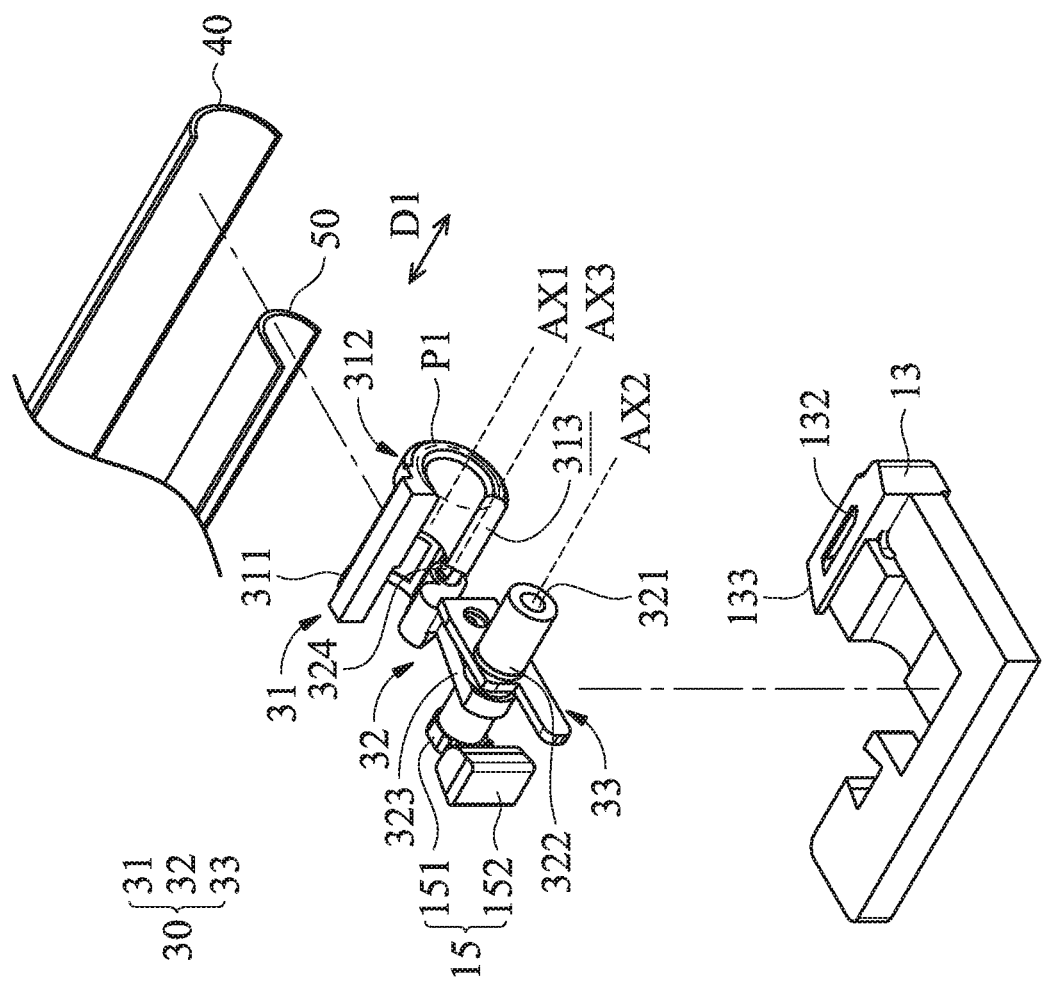
FIG. 4 is a perspective view of the hinge mechanism and the raising mechanism in accordance with some embodiments of the disclosure.
Figure 5:
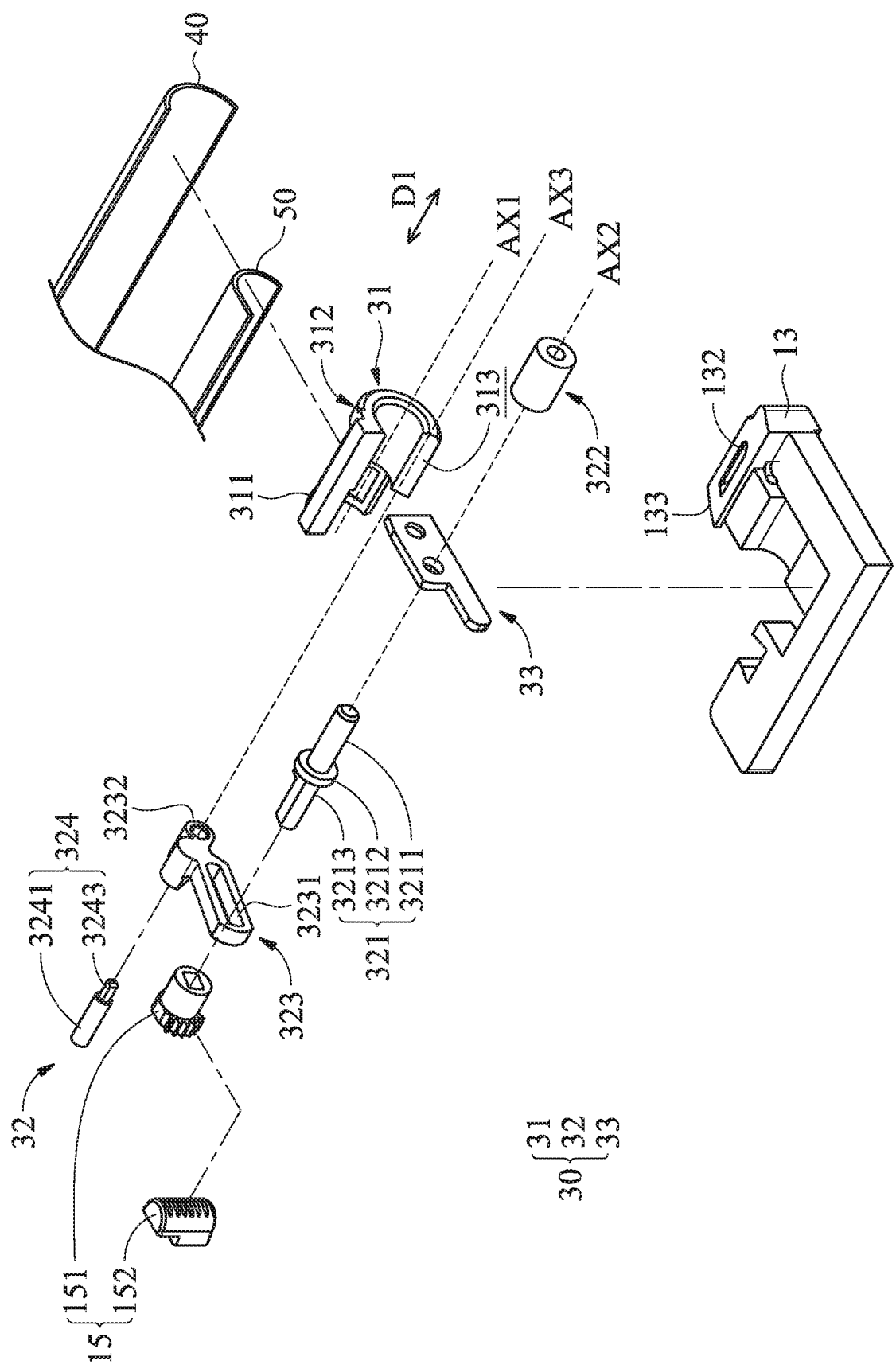
FIG. 5 is an exploded view of the hinge mechanism and the raising mechanism in accordance with some embodiments of the disclosure.
Figure 6A:
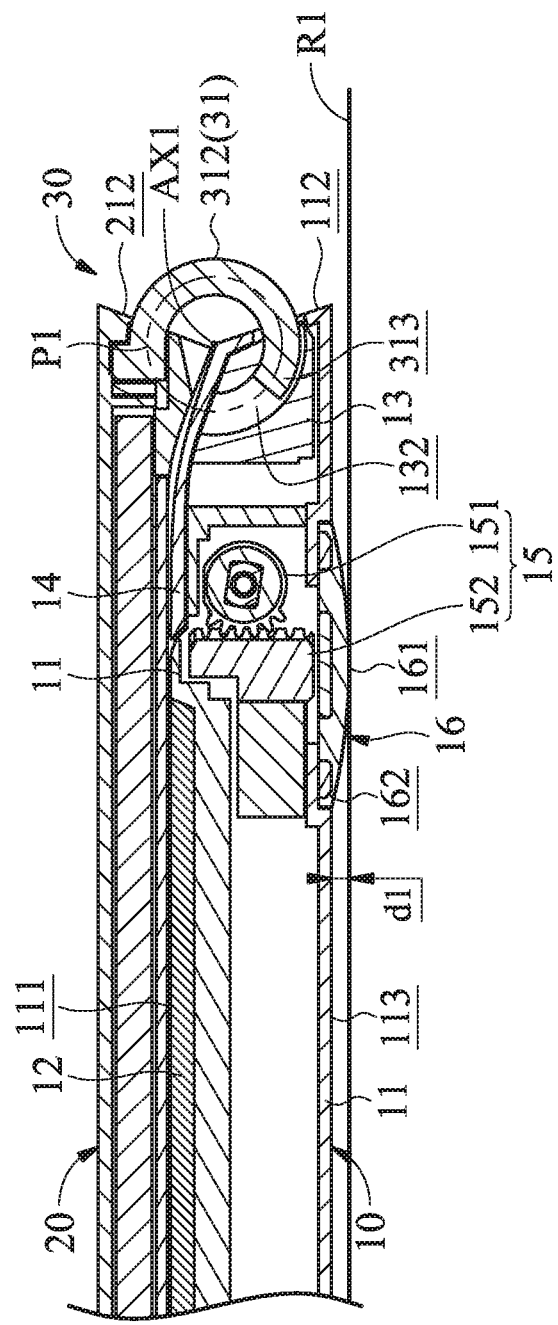
FIG. 6A and FIG. 6B are schematic views of the laptop computer in accordance with some embodiments of the disclosure, wherein the laptop computer is in a closed position.
Figure 6B:
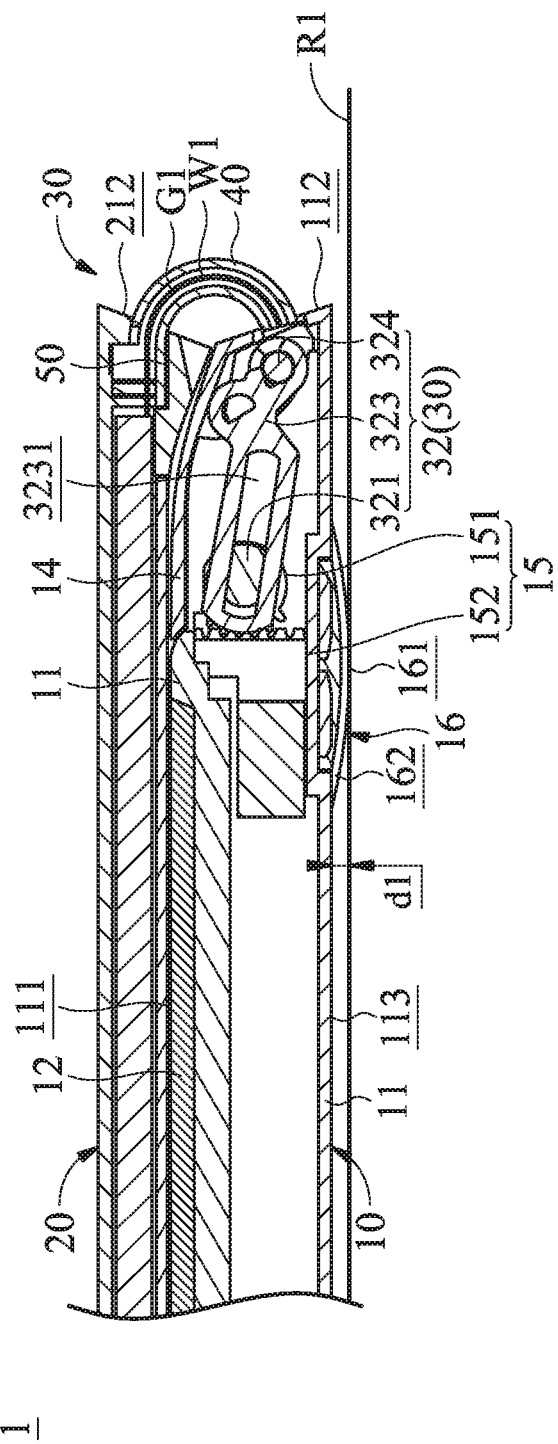

FIG. 3 is an exploded view of the laptop computer 1 in accordance with some embodiments of the disclosure. FIG. 4 is a perspective view of the hinge mechanism 30 and the raising mechanism 15 in accordance with some embodiments of the disclosure. FIG. 5 is an exploded view of the hinge mechanism 30 and the raising mechanism 15 in accordance with some embodiments of the disclosure. FIG. 6A and FIG. 6B are schematic views of the laptop computer 1 in accordance with some embodiments of the disclosure. In FIGS. 3 to 6B, the laptop computer 1 is in a closed position.

The host 10 further includes a base 13 disposed in the housing 11. The base 13 further includes a curved groove 132 (such as FIG. 6A). The base 13 may be fastened in the housing 11 via fastening elements (not shown in figures). In some embodiments, the base 13 and the housing 11 are formed as a single piece.

The hinge mechanism 30 includes a rotation element 31, a torque assembly 32, and a fixed element 33. The rotation element 31 may be affixed to the display 20, and rotated relative to the curved groove 132. The rotation element 31 includes a rotation body 311 and a curved portion 312.

The rotation body 311 is affixed to the rear side 212 of the display 20. The curved portion 312 is connected to the rotation body 311. In some embodiments, the rotation body 311 and the curved portion 312 are formed as a single piece.

The curved portion 312 is located in the curved groove 132. As shown in FIG. 6A, when the display 20 is rotated relative to the host 10, the curved portion 312 is rotated relative to the curved groove 132 along a curved path P1. In this embodiment, the curved groove 132 and the curved portion 312 are C-shaped.

In some embodiments, the curved path P1 is a circular path. A main axis AX1 passes through the center of the curved path P1. The curved path P1 is located on a plane that is perpendicular to the main axis AX1. In this embodiment, the curved portion 312 is rotated relative to the curved groove 132 about the main axis AX1. In other words, the display 20 is rotated relative to the host 10 about the main axis AX1.

The torque assembly 32 is connected to the rotation element 31 and the fixed element 33. The torque assembly 32 is configured to apply torque between the host 10 and the display 20. The torque assembly 32 includes a first shaft 321, a torque element 322, a connection element 323, and a second shaft 324.

The first shaft 321 is connected to the connection element 323 and the fixed element 33. The first shaft 321 extends along a first axis AX2. The first axis AX2 is parallel to the main axis AX1. In this embodiment, the first shaft 321 pivots on the fixed element 33. The first shaft 321 may be rotated relative to the fixed element 33 about the first axis AX2. Moreover, the first shaft 321 is rotated with the connection element 323.

The first shaft 321 includes a first pivoting portion 3211, a first blocking portion 3212, and a first retaining portion 3213. The first pivoting portion 3211 may be a circular cylinder, passing through the fixed element 33. The first blocking portion 3212 is connected to the first pivoting portion 3211 and the first retaining portion 3213. The first retaining portion 3213 passes through the connection element 323.

The torque element 322 is disposed on the first pivoting portion 3211 of the first shaft 321 and configured to apply a first torque between the first shaft 321 and the fixed element 33. The fixed element 33 is clamped between the torque element 322 and the first blocking portion 3212. The torque element 322 may be ring-like element, and the first pivoting portion 3211 may passes through the center of the torque element 322.

The connection element 323 is disposed on the first retaining portion 3213 of the first shaft 321, and abuts the first blocking portion 3212. The connection element 323 may extend perpendicular to the first axis AX2. In other words, the connection element 323 may be perpendicular to the first shaft 321.

The connection element 323 has a first connection hole 3231 and a second connection hole 3232. The first retaining portion 3213 of the first shaft 321 passes through the first connection hole 3231, and can be moved along the first connection hole 3231. Moreover, the first connection hole 3231 can limit the rotation of the connection element 323 relative to the first retaining portion 3213. In other words, the connection element 323 cannot be rotated relative to the first shaft 321.

In some embodiments, the longest length of the first connection hole 3231 is longer than 1.1 times the longest width of the first shaft 321. The longest length and the longest width are measured in the same direction perpendicular to the first axis AX2.

In some embodiments, the longest width of the first connection hole 3231 is substantially equal to the greatest thickness of the first shaft 321. The longest width and the greatest thickness are measured in the same direction perpendicular to the first axis AX2.

The second shaft 324 is connected to the connection element 323 and the rotation element 31, and extends parallel to the first shaft 321. In this embodiment, the second shaft 324 extends along a second axis AX3. The second axis AX3 is parallel to the first axis AX2 and the main axis AX1.

The second shaft 324 includes a second pivoting portion 3241 and a second retaining portion 3243. The second pivoting portion 3241 pivots on the connection element 323, and passes through the second connection hole 3232. In other words, the second shaft 324 is rotatable relative to the connection element 323. In this embodiment, the connection element 323 applies a second torque to the second shaft 324.

The second retaining portion 3243 is connected to the second pivoting portion 3241 and the curved portion 312. In this embodiment, the second retaining portion 3243 is affixed to the connection end 313 of the curved portion 312, and the second shaft 324 is rotated and moved with the curved portion 312. In some embodiments, the second shaft 324 cannot be rotated relative to the curved portion 312.

The fixed element 33 is connected to the torque assembly 32, and affixed to the housing 11. In this embodiment, the fixed element 33 is affixed to the base 13. The fixed element 33 includes a first plate 331 and a second plate 332. The first plate 331 extends along a plane that is perpendicular to the first axis AX2. In other words, the first plate 331 is perpendicular to the first shaft 321. The second plate 332 extends perpendicular to first plate 331.

As shown in FIG. 2 to FIG. 4, in this embodiment, the laptop computer 1 further includes a first curved cover 40, and a second curved cover 50. The first curved cover 40 and the second curved cover 50 cover the rear side 112 of the host 10 and the rear side 212 of the display 20.

As shown in FIG. 4 and FIG. 6B, the first curved cover 40 and the second curved cover 50 are connected to or affixed to the rotation body 311 of the rotation element 31. The first curved cover 40 and the second curved cover 50 extend along the extension direction D1. A cross section of the first curved cover 40 and the second curved cover 50, which is perpendicular to the extension direction D1, is curved. The first curved cover 40 is separated from and parallel to the second curved cover 50. A gap G1 is formed between the first curved cover 40 and the second curved cover 50.

As shown in FIG. 6B, the laptop computer 1 further includes a transmission wire W1 connected to the host 10 and the display 20, and adjacent to the first curved cover 40 and the second curved cover 50. The transmission wire W1 is located in the gap G1.

The shapes of the first curved cover 40 and the second curved cover 50 correspond to the shape of the rotation element 31. Therefore, with the first curved cover 40 and/or the second curved cover 50, the appearance of the rear side of the laptop computer 1 can be improved, and the transmission wire W1 can be finely configured in the laptop computer 1.

As shown in FIGS. 6A and 6B, the laptop computer 1 is in a closed position, and the display 20 covers the host 10. Moreover, the connection end 313 of the curved portion 312 of the rotation element 31 is located in the curved groove 132 of the base 13. The protection cover 14 of the housing 11 is located on the operation surface 111 of the housing 11. The protection cover 14 pivots on the housing 11.

Figure 7:
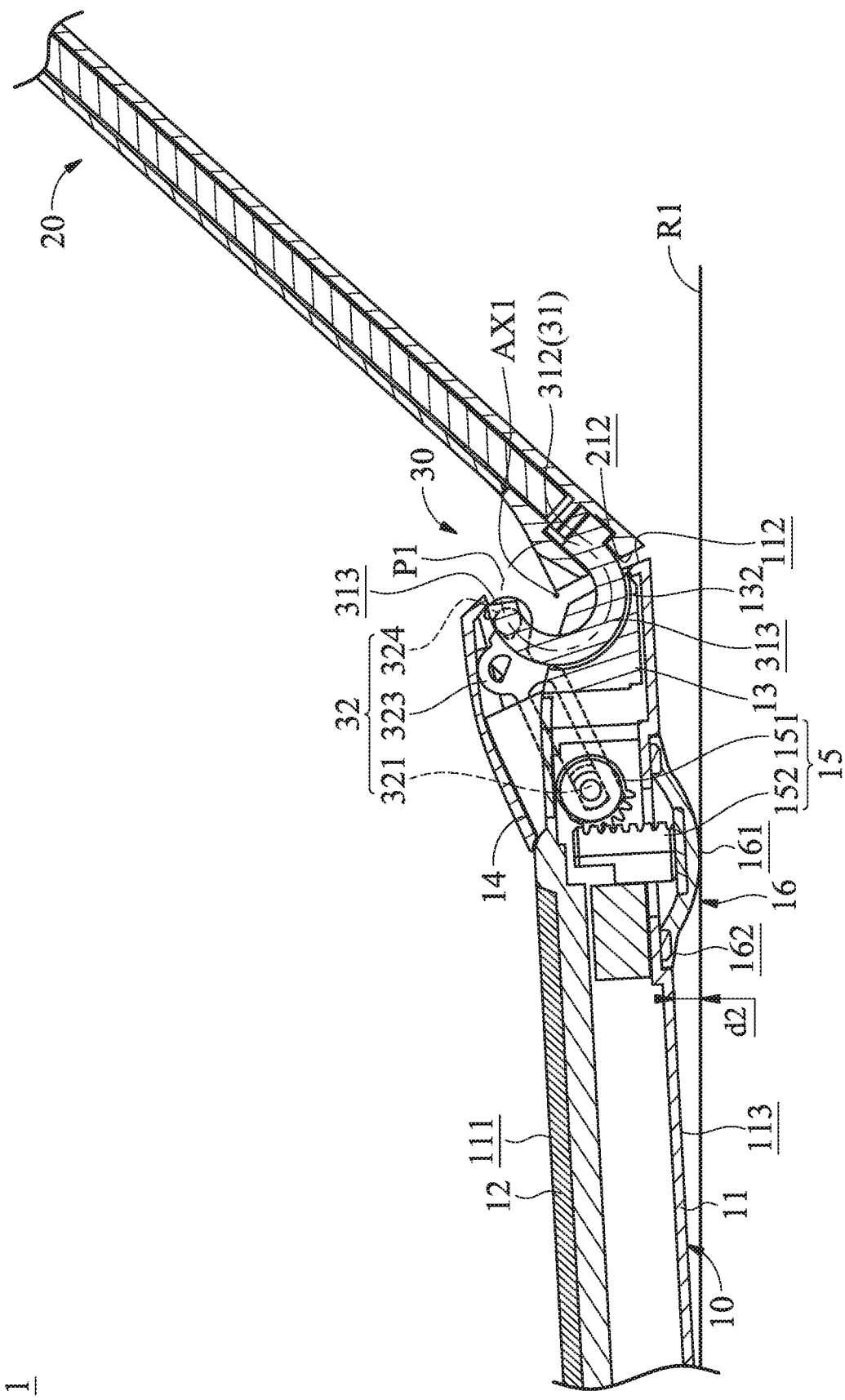
FIG. 7 is a schematic view of the laptop computer in accordance with some embodiments of the disclosure, wherein the laptop computer is in a use position.

FIG. 7 is a schematic view of the laptop computer 1 in accordance with some embodiments of the disclosure, wherein the laptop computer 1 is in a use position. The display 20 can be rotated relative to the host 10, so as to make the display 20 to be inclined relative to the host 10. As shown in FIG. 7, the connection end 313 leaves the curved groove 132, and is exposed from the base 13. The connection end 313 drives the second shaft 324 to move. In addition, the second shaft 324 drives the connection element 323 to rotate about the first shaft 321.

When the laptop computer 1 is in a use position, the connection end 313 and the connection element 323 are protruded from the operation surface 111 of the housing 11. The connection element 323 pushes the protection cover 14 to be inclined relative to the operation surface 111. In some embodiments, an electric element (such as a microphone, an antenna, and a camera) is disposed on the protection cover 14.

Therefore, with the disclosed hinge mechanism 30, the display 20 can be rotated relative to the host 10 via the hinge mechanism 30, and the appearance of the rear side of the laptop computer 1 can be improved.

In this embodiment, the host 10 further includes a raising mechanism 15 and a footpad 16. The raising mechanism 15 is disposed in the housing 11, and passes through the bottom surface 113 of the housing 11. The raising mechanism 15 is connected to the first retaining portion 3213 of the first shaft 321, and connected to the footpad 16. When the display 20 is rotated relative to the host 10, the first shaft 321 drives the raising mechanism 15 to change the distance between the top end 161 of the footpad 16 and the bottom surface 113. In this embodiment, the raising mechanism 15 may be a mechanical raising mechanism. In some embodiments, the raising mechanism 15 is an electric raising mechanism.

As shown in FIGS. 4, 5, 6A and 6B, the raising mechanism 15 further includes a gear 151 and a rack 152. The first retaining portion 3213 passes through the center of the gear 151, and the gear 151 is affixed to the first retaining portion 3213. In other words, the gear 151 is rotated with the first retaining portion 3213. The rack 152 is engaged with the gear 151. The rack 152 passes through the housing 11, and is connected to the footpad 16.

The footpad 16 is disposed on the outside of the housing 11, and adjacent to the bottom surface 113 of the housing 11. The footpad 16 is connected to the raising mechanism 15. The bottom surface 113 is opposite to the operation surface 111 and is parallel to the operation surface 111.

In this embodiment, the footpad 16 has a top end 161 and a bottom end 162. The top end 161 is far from the bottom surface 113, and the bottom end 162 is affixed to the bottom surface 113 of the housing 11. In some embodiments, the top end 161 of the footpad 16 is in contact with the bottom surface 113 of the housing 11.

As shown in FIGS. 6A and 6B, the laptop computer 1 is in a closed position, and the display 20 covers the host 10. When the display 20 is in a cover position, the rack 152 is in contact with the footpad 16, and a first distance d1 is between the top end 161 of the footpad 16 and the bottom surface 113.

When the host 10 is put on a reference plane R1, the footpad 16 is in contact with the reference plane R1. In other words, a first distance d1 is between the bottom surface 113, that is adjacent to the rear side 112, and the reference plane R1.

As shown in FIG. 7, the laptop computer 1 is in a use position. The user rotates the display 20 relative to the host 10 so as to make the display 20 inclined relative to the host 10. At this time, the first shaft 321 is rotated and drives the gear 151 to rotate. When the gear 151 is rotated, the gear 151 drives the rack 152 to move, and one end of the rack 152 abuts the footpad 16 so as to change the distance between the top end 161 and the bottom surface 113.

While the display 20 is moving from the cover position to the open position, the distance between the top end 161 and the bottom surface 113 increases gradually. While the display 20 is moving from the open position to the cover position, the distance between the top end 161 and the bottom surface 113 decreases gradually.

In this embodiment, when the display 20 is in an open position, the rack 152 abuts the footpad 16 so as to make a second distance d2 between the top end 161 and the bottom surface 113, wherein the second distance d2 is longer than the first distance d1. In other words, due to the second distance d2 between the bottom surface 113 of the rear side 112 of the host 10 and the reference plane R1, the inclination of the host 10 relative to the reference plane R1 can be increased.

Therefore, the distance between the top end 161 of the footpad 16 and the bottom surface 113 can be changed by the raising mechanism 15 when the display 20 rotates relative to the host 10. Moreover, when the display 20 is in a cover position, the distance between the top end 161 of the footpad 16 and the bottom surface 113 is decreased. Therefore, the thickness of the laptop computer 1 can be reduced to meet the user's requirement for the thickness of the laptop computer 1.

In addition, when the display 20 is in a cover position, the distance between the top end 161 of the footpad 16 on the rear side 112 of the host 10 and the bottom surface 113 is increased. Therefore, as shown in FIG. 7, when the host 10 is put on a reference plane R1, the space between the rear side 112 of the housing 11 and the reference plane R1 can be increased by the footpad 16, and thus the heat-dissipation efficiency of the laptop computer is improved.

Figure 8:
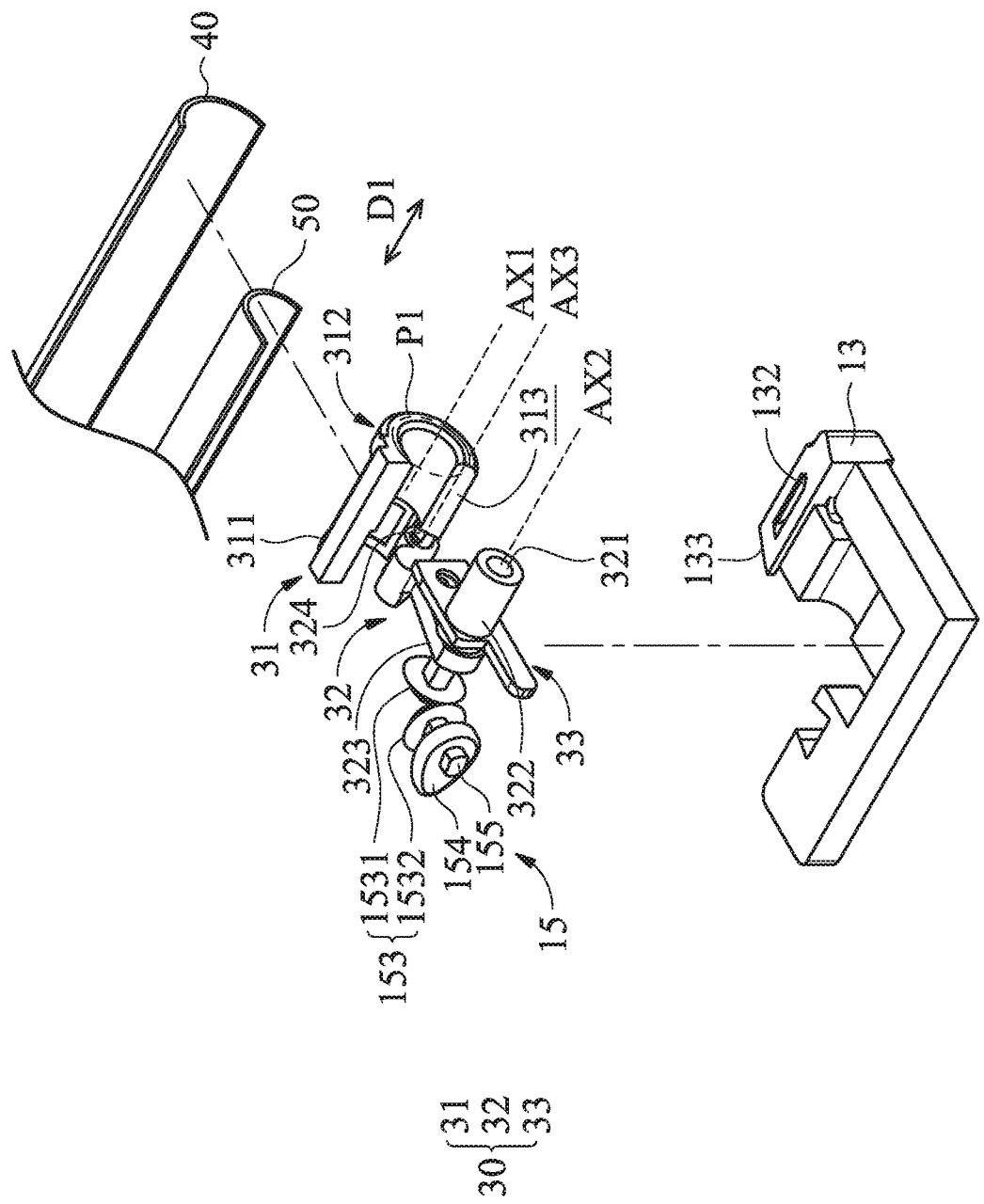
FIG. 8 is a perspective view of the hinge mechanism and the raising mechanism in accordance with some embodiments of the disclosure.
Figure 9:
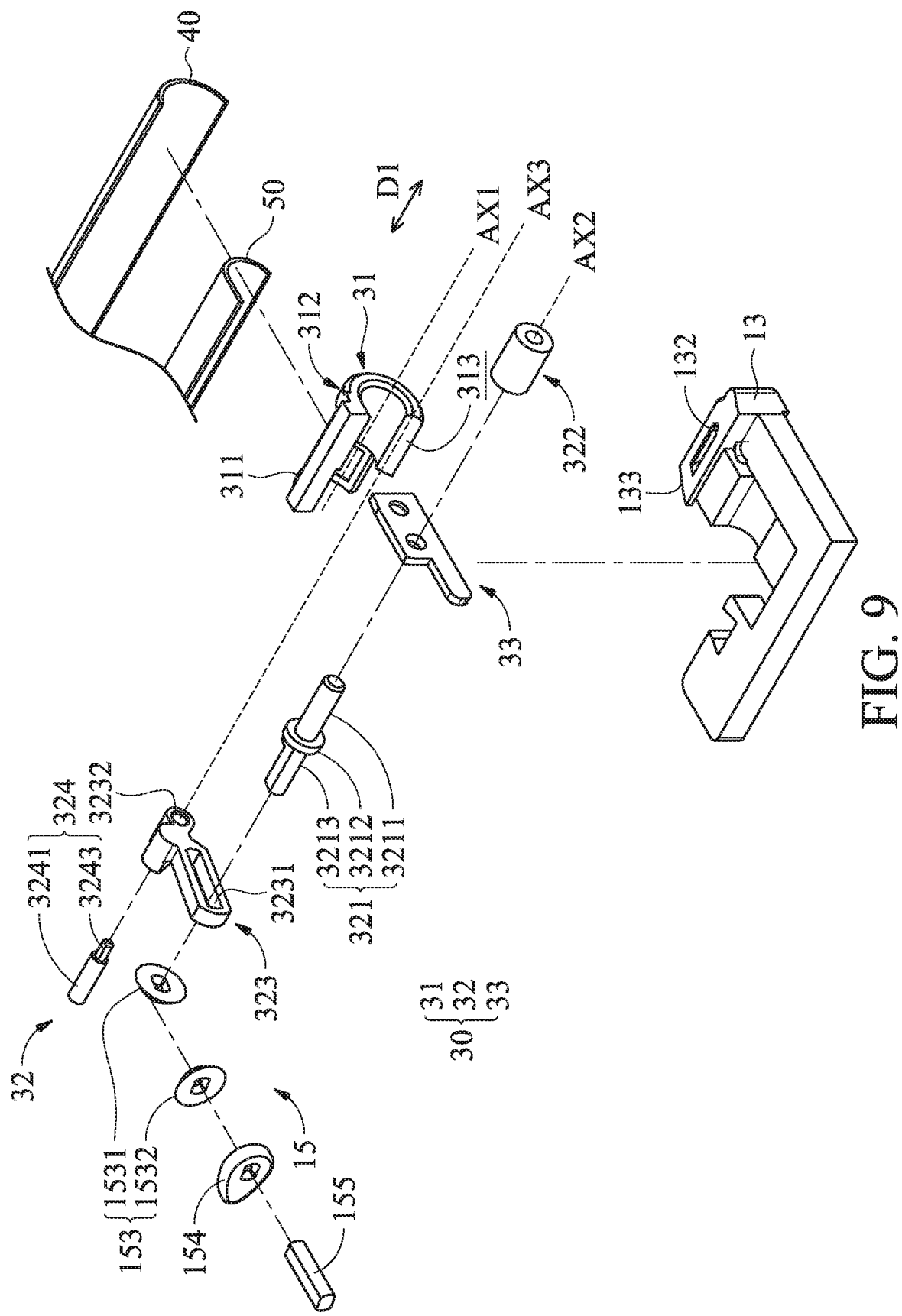
FIG. 9 is an exploded view of the hinge mechanism and the raising mechanism in accordance with some embodiments of the disclosure.
Figure 10:
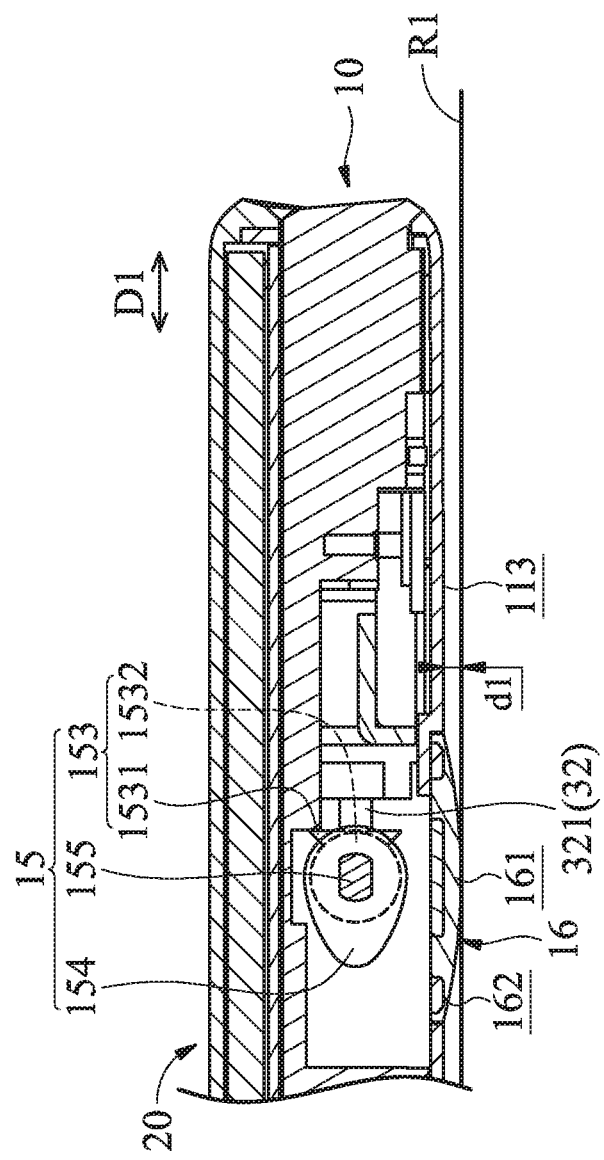
FIG. 10 is a cross-sectional view of the laptop computer in accordance with some embodiments of the disclosure, wherein the laptop computer is in a closed position.

FIG. 8 is a perspective view of the hinge mechanism 30 and the raising mechanism 15 in accordance with some embodiments of the disclosure. FIG. 9 is an exploded view of the hinge mechanism 30 and the raising mechanism 15 in accordance with some embodiments of the disclosure. FIG. 10 is a cross-sectional view of the laptop computer 1 in accordance with some embodiments of the disclosure. In FIGS. 8 to 10, the laptop computer 1 is in a closed position.

In this embodiment, the raising mechanism 15 includes a gear assembly 153, a cam 154, and an auxiliary shaft 155. The gear assembly 153 is connected to the first shaft 321. The cam 154 is connected to the gear assembly 153, and connected to the footpad 16. When the display 20 is rotated relative to the host 10, the gear assembly 153 drives the cam 154 to rotate.

In this embodiment, the gear assembly 153 includes a first gear 1531 and a second gear 1532. The first shaft 321 may pass through the center of the first gear 1531, and the first gear 1531 is affixed to the first shaft 321. The auxiliary shaft 155 may pass through the center of the second gear 1532, and pass through the cam 154. The second gear 1532 and the cam 154 may be affixed to the auxiliary shaft 155. One end of the auxiliary shaft 155 may pivot on the base 13. In other words, the gear 151 is rotated with the first shaft 321, and the cam 154 is rotated with the second gear 1532.

As shown in FIG. 10, the laptop computer 1 is in a closed position, and the display 20 covers the host 10. When the display 20 is in a cover position, the cam 154 is in contact with the footpad 16, and a first distance d1 is between the top end 161 of the footpad 16 and the bottom surface 113.

Figure 11:
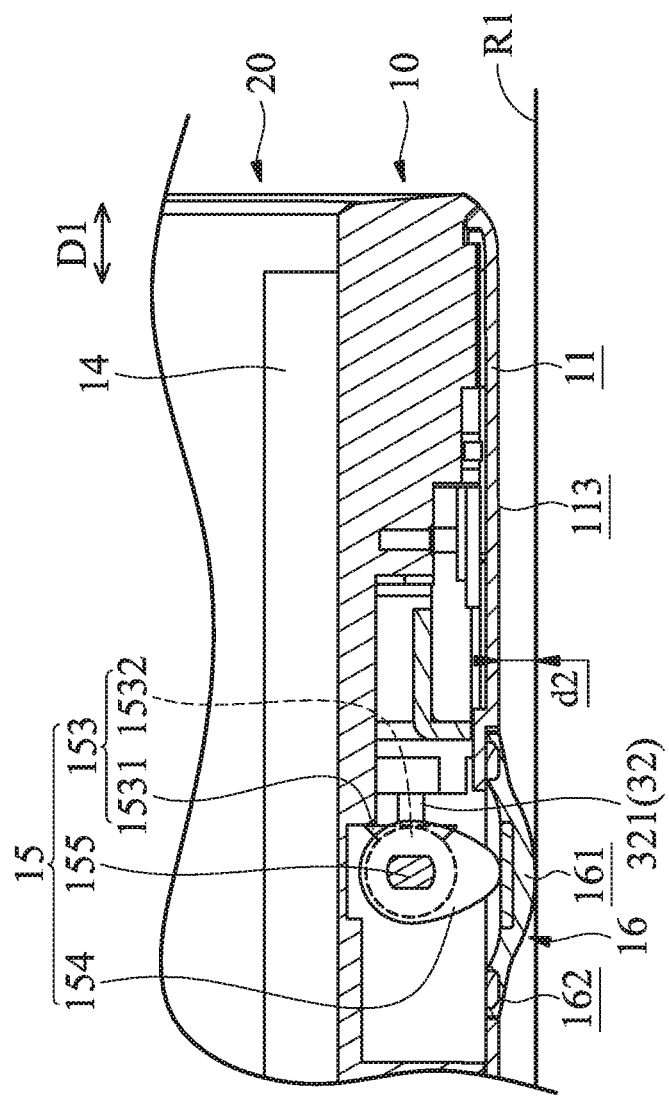
FIG. 11 is a cross-sectional view of the laptop computer in accordance with some embodiments of the disclosure, wherein the laptop computer is in a use position.

As shown in FIG. 11, the laptop computer 1 is in a use position. The display 20 can be rotated relative to the host 10 so as to make the display 20 inclined relative to the host 10.

At this time, the first shaft 321 is rotated and drives the first gear 1531 to rotate. When the first gear 1531 is rotated, the second gear 1532 and the cam 154 are rotated with the first gear 1531. The protrusion portion 1541 of the cam 154 abuts the footpad 16 so as to change the distance between the top end 161 and the bottom surface 113.

In this embodiment, when the display 20 is in an open position, the protrusion portion 1541 of the cam 154 abuts the footpad 16 so as to form a second distance d2 between the top end 161 and the bottom surface 113, and thus the inclination of the host 10 relative to the reference plane R1 can be increased.

In conclusion, the laptop computer of the present disclosure utilizes the raising mechanism linked with the display to raise the rear side of the host when the display of the laptop computer in an open position. Therefore, the heat-dissipation space under the bottom of the host is increased, and thus the heat-dissipation efficiency of the host is improved.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A laptop computer, comprising:
    a host comprising:
    a housing having a bottom surface;
    a raising mechanism disposed in the housing; and
    a footpad connected to the raising mechanism, and adjacent to the bottom surface, wherein the footpad has a top end far from the bottom surface;
    a hinge mechanism connected to the host, and comprising:
    a first shaft connected to the raising mechanism; and
    a display connected to the hinge mechanism, and being rotatable relative to the host via the hinge mechanism,
    wherein when the display is rotated relative to the host, the first shaft drives the raising mechanism to change a distance between the top end of the footpad and the bottom surface of the housing,
    wherein the host further comprises a base disposed in the housing, and having a curved groove, and the hinge mechanism further comprises a rotation element comprising a curved portion located in the curved groove,
    wherein when the display is rotated relative to the host, the curved portion is rotated relative to the curved groove along a curved path.

2. The laptop computer as claimed in claim 1, wherein while the display is moving from a cover position to an open position, a distance between the top end and the bottom surface increases gradually,
    wherein while the display is moving from the open position to the cover position, the distance between the top end and the bottom surface decreases gradually.

3. The laptop computer as claimed in claim 1, wherein the raising mechanism is a mechanical raising mechanism.

4. The laptop computer as claimed in claim 1, wherein the raising mechanism comprises:
    a gear connected to the first shaft; and
    a rack engaged with the gear, and connected to the footpad.

5. The laptop computer as claimed in claim 1, wherein the raising mechanism comprises:
    a gear assembly connected to the first shaft; and
    a cam connected to the gear assembly, and in contact with the footpad,
    wherein when the display is rotated relative to the host, the gear assembly drives the cam to rotate.

6. The laptop computer as claimed in claim 5, wherein when the display is in a cover position, there is a first distance between the top end and the bottom surface, and when the display is in an open position, the cam abuts the footpad, and there is a second distance between the top end and the bottom surface, wherein the second distance is greater than the first distance.

7. The laptop computer as claimed in claim 1, wherein the curved path is a circular path, and the curved groove and the curved portion are C-shaped.

8. The laptop computer as claimed in claim 1, wherein the hinge mechanism further comprises:
    a torque assembly connected to the rotation element, and configured to apply a torque between the host and the display; and
    a fixed element connected to the torque assembly, and affixed to the housing.

9. The laptop computer as claimed in claim 8, wherein the torque assembly comprises the first shaft pivoting on the fixed element, wherein the torque assembly further comprises:
    a connection element connected to the first shaft; and
    a second shaft connected to the connection element and the rotation element, and extending parallel to the first shaft.

10. The laptop computer as claimed in claim 9, wherein the torque assembly further comprises a plurality of torque elements disposed on the first shaft, and the torque elements are configured to apply a torque between the first shaft and the fixed element.

11. The laptop computer as claimed in claim 1, further comprising:
    a first curved cover connected to the rotation element;
    a second curved cover connected to the rotation element, wherein a gap is formed between the second curved cover and the first curved cover; and
    a transmission wire connected to the host and the display, and located in the gap.

\* \* \* \* \*